(12) United States Patent
Solbrig

(10) Patent No.: US 8,096,110 B2
(45) Date of Patent: Jan. 17, 2012

(54) AMMONIA ($NH_3$) STORAGE CONTROL SYSTEM AND METHOD AT LOW NITROGEN OXIDE ($NO_x$) MASS FLOW RATES

(75) Inventor: Charles E. Solbrig, Ypsilanti, MI (US)

(73) Assignee: GM Global Technology Operations LLC

( * ) Notice: Subject to any disclaimer, the term of this patent is extended or adjusted under 35 U.S.C. 154(b) by 538 days.

(21) Appl. No.: 12/273,751

(22) Filed: Nov. 19, 2008

(65) Prior Publication Data

US 2010/0122524 A1   May 20, 2010

(51) Int. Cl.
*F01N 3/00* (2006.01)
(52) U.S. Cl. .............. 60/286; 60/274; 60/285; 60/297; 60/301; 60/303
(58) Field of Classification Search ............ 60/274, 60/278, 280, 285, 286, 297, 301, 303
See application file for complete search history.

(56) References Cited

U.S. PATENT DOCUMENTS

| | | | | |
|---|---|---|---|---|
| 6,725,651 B2 * | 4/2004 | Itoh et al. | | 60/286 |
| 7,017,335 B2 * | 3/2006 | Huber et al. | | 60/286 |
| 7,178,328 B2 * | 2/2007 | Solbrig | | 60/286 |
| 7,617,672 B2 * | 11/2009 | Nishina et al. | | 60/277 |
| 7,644,577 B2 * | 1/2010 | Linna et al. | | 60/286 |
| 2009/0272104 A1 * | 11/2009 | Garimella et al. | | 60/287 |

FOREIGN PATENT DOCUMENTS

DE   102006025257   12/2007

OTHER PUBLICATIONS

U.S. Appl. No. 11/786,036, filed Apr. 10, 2007, Charles Solbrig.

* cited by examiner

*Primary Examiner* — Binh Q Tran

(57) ABSTRACT

A control system comprising an ammonia ($NH_3$) storage level determination module that determines a $NH_3$ storage level in an exhaust system, a desired $NH_3$ storage level determination module that determines a desired $NH_3$ storage level based on an exhaust temperature, and a nitrogen oxide ($NO_x$) mass flow rate control module that controls a $NO_x$ mass flow rate based on a difference between the $NH_3$ storage level and the desired $NH_3$ storage level. A method comprising determining a $NH_3$ storage level in an exhaust system, determining a desired $NH_3$ storage level based on an exhaust temperature, and controlling a $NO_x$ mass flow rate based on a difference between the $NH_3$ storage level and the desired $NH_3$ storage level.

20 Claims, 4 Drawing Sheets

AMMONIA ($NH_3$) STORAGE CONTROL SYSTEM AND METHOD AT LOW NITROGEN OXIDE ($NO_x$) MASS FLOW RATES

FIELD

The present disclosure relates to emission control systems and methods, and more particularly to ammonia ($NH_3$) storage control systems and methods at low nitrogen oxide ($NO_x$) mass flow rates.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture to generate drive torque. The combustion process generates exhaust that is exhausted from the engine to the atmosphere. The exhaust contains nitrogen oxides ($NO_x$), carbon dioxide ($CO_2$), carbon monoxide (CO), hydrocarbons (HC), and particulates. An exhaust system treats the exhaust to reduce emissions prior to being released to the atmosphere.

In an exemplary exhaust system, a dosing system injects a dosing agent (e.g., urea) into the exhaust upstream of a selective catalytic reduction (SCR) catalyst. The dosing agent breaks down to form ammonia ($NH_3$) that is stored in the SCR catalyst. $NH_3$ stored in the SCR catalyst reacts with $NO_x$ to form nitrogen ($N_2$) and water ($H_2O$), which reduces the $NO_x$ levels released to the atmosphere.

SUMMARY

The present disclosure provides a control system comprising an ammonia ($NH_3$) storage level determination module that determines a $NH_3$ storage level in an exhaust system, a desired $NH_3$ storage level determination module that determines a desired $NH_3$ storage level based on an exhaust temperature, and a nitrogen oxide ($NO_x$) mass flow rate control module that controls a $NO_x$ mass flow rate based on a difference between the $NH_3$ storage level and the desired $NH_3$ storage level. In addition, the present disclosure provides a method comprising determining a $NH_3$ storage level in an exhaust system, determining a desired $NH_3$ storage level based on an exhaust temperature, and controlling a $NO_x$ mass flow rate based on a difference between the $NH_3$ storage level and the desired $NH_3$ storage level.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
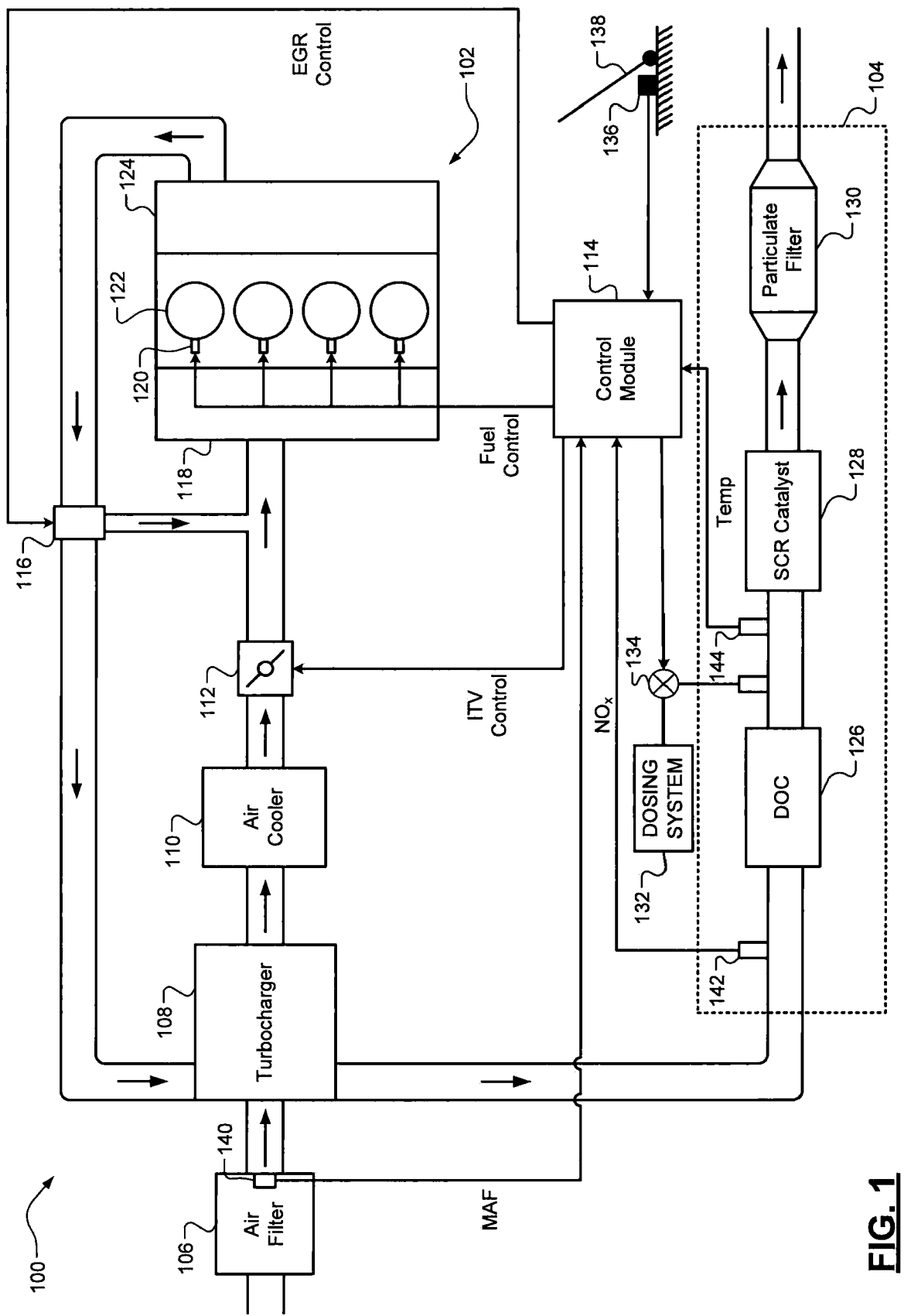
FIG. 1 is a schematic illustration of a vehicle including an emission control system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A selective catalytic reduction (SCR) catalyst can reduce $NO_x$ emissions effectively when the amount of $NH_3$ stored in the SCR catalyst is controlled. For example, the $NH_3$ storage level may be maintained to maximize the $NO_x$ conversion efficiency under various operating conditions. As the temperature of the SCR catalyst increases, the $NH_3$ storage level may be reduced to avoid $NH_3$ slip (i.e., excess $NH_3$ released from the SCR catalyst).

An emissions control system and method according to the present disclosure determines an ammonia ($NH_3$) storage level in the SCR catalyst and controls a nitrogen oxide ($NO_x$) mass flow rate upstream from the SCR catalyst based on the $NH_3$ storage level. The $NH_3$ storage level may be determined based on an amount of dosing agent (e.g., urea) injected upstream from the SCR catalyst and an amount of $NH_3$ consumed in the SCR catalyst. A desired $NH_3$ storage level may be determined based on an exhaust temperature to maximize $NO_x$ conversion efficiency while avoiding $NH_3$ slip. When the $NH_3$ storage level exceeds the desired $NH_3$ storage level, the $NO_x$ mass flow rate may be increased to reduce the $NH_3$ storage level to the desired $NH_3$ storage level.

Referring now to FIG. 1, a functional block diagram of a vehicle 100 is presented. The vehicle 100 includes a diesel engine 102 and an exhaust system 104. The diesel engine 102 combusts a mixture of air and diesel fuel to produce drive torque and releases exhaust into the exhaust system 104. The exhaust system 104 treats exhaust to reduce emissions released to the atmosphere.

Air may enter the diesel engine 102 through an air filter 106 and continue through the intake side of a turbocharger 108. The turbocharger 108 compresses the air using a turbine (not shown) that is powered by exhaust from the diesel engine 102. The compressed air may pass through an air cooler 110 or other conditioners before passing through an intake throttle valve (ITV) 112.

A control module 114 positions the ITV 112 at various angles to adjust the mass flow rate of the compressed air. Exhaust gases may be recirculated via an exhaust gas recirculation (EGR) valve 116 to create an air mixture as the air enters an intake manifold 118. The control module 114 controls the position of the EGR valve 116 to adjust the amount of exhaust recirculated.

The air mixture from the intake manifold 118 is combined with fuel from fuel injectors 120 in cylinders 122 and the resulting air-fuel mixture is combusted to produce torque. Although FIG. 1 depicts four cylinders, the diesel engine 102 may include additional or fewer cylinders 122. Exhaust gases exit the cylinders 122 through an exhaust manifold 124 and pass through the turbocharger 108 to the exhaust system 104.

The exhaust system 104 may include a diesel oxidation catalyst (DOC) 126, a selective catalytic reduction (SCR) catalyst 128, and a particulate filter 130. The DOC 126 reduces particulate matter, hydrocarbons, and carbon monoxide in the exhaust through oxidation. The SCR catalyst 128 reacts with $NO_x$ in the exhaust to reduce $NO_x$ emissions. The particulate filter 130 collects particulate matter from the exhaust before the exhaust is released to the atmosphere.

A dosing system 132 may inject a dosing agent (e.g., urea) into the exhaust downstream of the DOC 126. The control module 114 regulates the amount of dosing agent injected via a valve 134. The dosing agent breaks down to form ammonia ($NH_3$) that is stored in the SCR catalyst 128. $NH_3$ stored in the SCR catalyst 128 reacts with $NO_x$ in the exhaust to form nitrogen ($N_2$) and water ($H_2O$), which reduces $NO_x$.

The control module 114 communicates with an accelerator pedal sensor 136 and a mass airflow (MAF) sensor 140. The accelerator pedal sensor 136 generates a signal indicating a position of an accelerator pedal 138. The MAF sensor 140 generates a signal indicating a mass of air passing through the air filter 106 to the intake manifold 118. The control module 114 uses the pedal position signal and the MAF signal to control the ITV 112, the EGR valve 116, and the fuel injectors 120.

The exhaust system 104 may include a $NO_x$ sensor 142, and a temperature sensor 144, and other sensors that detect exhaust characteristics. The $NO_x$ sensor 142 detects a $NO_x$ concentration upstream from the DOC 126 and generates a signal indicating the $NO_x$ concentration. The temperature sensor 144 detects an exhaust temperature upstream from the SCR catalyst 128 and generates a signal indicating the exhaust temperature. The control module 114 receives the signals generated by the $NO_x$ sensor 142 and the temperature sensor 144.

Figure 2:
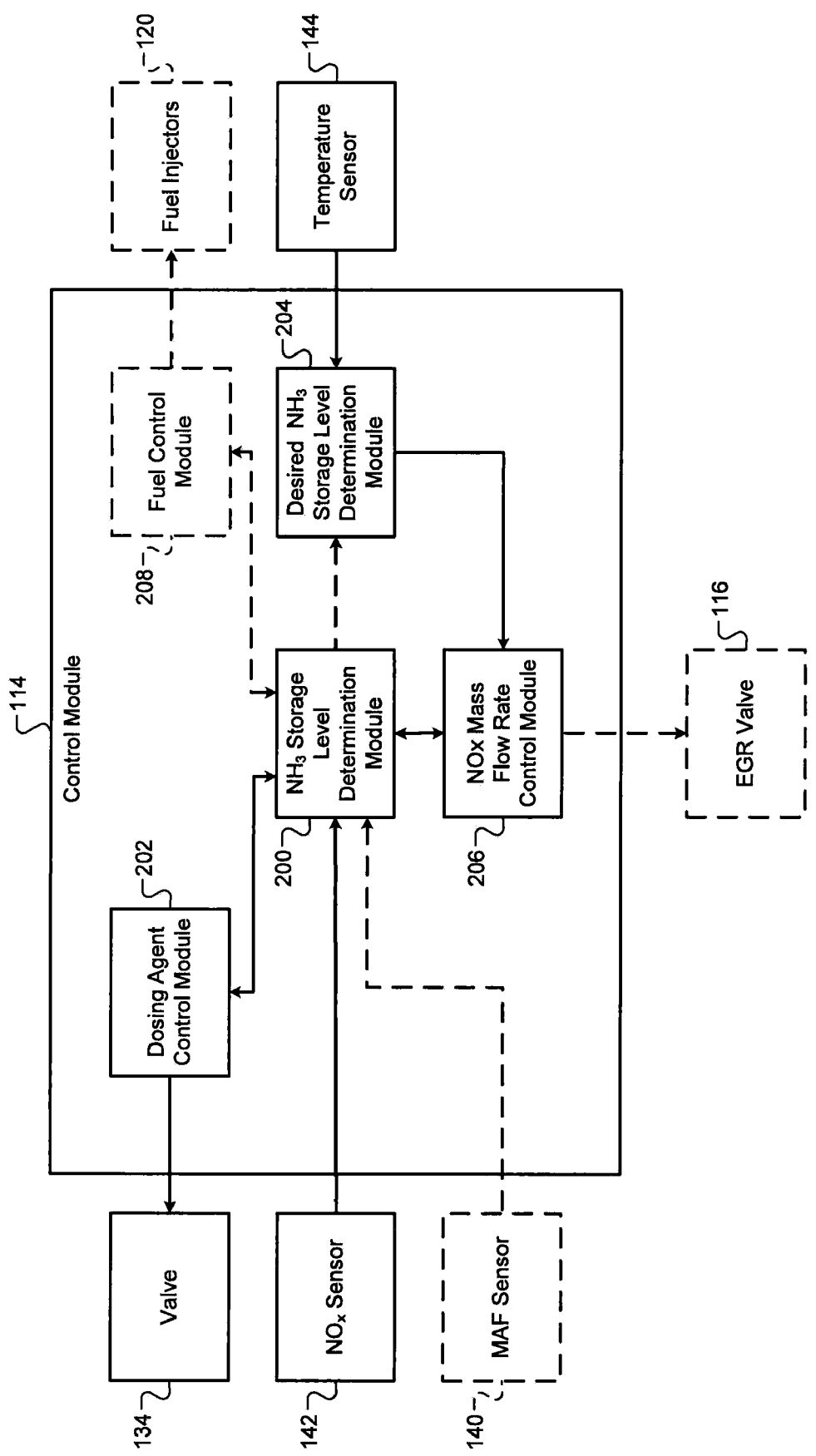
FIG. 2 is a functional block diagram of a control module of the emission control system of FIG. 1 according to the present disclosure.

Referring now to FIG. 2, the control module 114 includes a $NH_3$ storage level determination module 200, a dosing agent control module 202, a desired $NH_3$ storage level determination module 204, and a $NO_x$ mass flow rate control module 206. The $NH_3$ storage level determination module 200 determines a $NH_3$ storage level in the SCR catalyst 128. The dosing agent control module 202 controls the amount of dosing agent injected via the valve 134 and sends the amount of dosing agent injected to the $NH_3$ storage level determination module 200. The $NH_3$ storage level determination module 200 may determine the $NH_3$ storage level based on the amount of dosing agent injected and the amount of $NH_3$ consumed in the SCR catalyst 128, as disclosed in U.S. patent application Ser. No. 11/786,036, now U.S. Pat. No. 7,707,824 incorporated herein by reference.

The control module 114 may include a fuel control module 208 that controls fuel injection timing/amount via the fuel injectors 120. The $NH_3$ storage level determination module 200 may receive the MAF from the MAF sensor 140, the $NO_x$ concentration from the $NO_x$ sensor 142, and the fuel injection timing/amount from the fuel control module 208, and determine the amount of $NH_3$ consumed based thereon. More specifically, the $NH_3$ storage level determination module 200 may determine the amount of $NO_x$ entering the SCR catalyst 128 based on the MAF, the fuel injection timing/amount, and/or the $NO_x$ concentration, and determine the amount of $NH_3$ consumed based on the amount of $NO_x$ entering the SCR catalyst 128 and a predetermined conversion efficiency of the SCR catalyst 128.

The desired $NH_3$ storage level determination module 204 receives the exhaust temperature from the temperature sensor 144 and determines a desired $NH_3$ storage level based thereon. The desired $NH_3$ storage level determination module 204 may determine the desired $NH_3$ storage level using a predetermined relationship between the exhaust temperature and the desired $NH_3$ storage level that maximizes the $NO_x$ conversion efficiency in the SCR catalyst 128 while avoiding $NH_3$ slip (i.e., excess $NH_3$ released from the SCR catalyst 128).

In addition, the desired $NH_3$ storage level determination module 204 may receive the MAF and the fuel injection timing/amount from the $NH_3$ storage level determination module 200, and determine the desired $NH_3$ storage level based thereon. More specifically, the desired $NH_3$ storage level determination module 204 may determine the desired $NH_3$ storage level based on a predetermined relationship between the exhaust temperature, the MAF, the fuel injection timing/amount, and the desired $NH_3$ storage level. The predetermined relationship maximizes $NO_x$ conversion efficiency in the SCR catalyst 128 while avoiding $NH_3$ slip.

The $NO_x$ mass flow rate control module 206 receives inputs including the $NH_3$ storage level from the $NH_3$ storage level determination module 200 and the desired $NH_3$ storage level from the desired $NH_3$ storage level determination module 204. The dosing agent control module 202 receives inputs from the $NO_x$ mass flow rate control module 206, including the $NH_3$ storage level and the desired $NH_3$ storage level. The dosing agent control module 202 controls the amount of dosing agent injected and the $NO_x$ mass flow rate control module 206 controls a $NO_x$ mass flow rate upstream from the SCR catalyst 128 based on the inputs received.

More specifically, when the $NH_3$ storage level is greater than the desired $NH_3$ storage level, the $NO_x$ mass flow rate control module 206 increases the $NO_x$ mass flow rate to reduce the $NH_3$ storage level to the desired $NH_3$ storage level. When the $NH_3$ storage level is less than or equal to the desired $NH_3$ storage level, the dosing agent control module 202 increases the amount of doing agent injected to increase the $NH_3$ storage level to the desired $NH_3$ storage level.

The $NO_x$ mass flow rate control module 206 may control the $NO_x$ mass flow rate by adjusting the EGR valve 116. Closing the EGR valve 116 decreases the amount of exhaust recirculated, thereby allowing more air to enter the intake manifold 118 and increasing an air-to-fuel (A/F) ratio in the cylinders 122. Increasing the A/F ratio causes the diesel engine 102 to produce more $NO_x$ emissions. The $NO_x$ mass flow rate control module 206 may control the $NO_x$ mass flow rate via the EGR valve 116 based on a predetermined relationship between the MAF from the MAF sensor 140 and a desired $NO_x$ mass flow rate.

In addition, the $NO_x$ mass flow rate control module 206 may control the $NO_x$ mass flow rate by adjusting an injection timing of the fuel injectors 120. Advancing the injection timing increases a combustion temperature in the cylinders 122. Increasing the combustion temperature causes the diesel engine 102 to produce more $NO_x$ emissions. The $NO_x$ mass flow rate control module 206 may adjust the injection timing of the fuel injectors 120 via the fuel control module 208.

Figure 3:
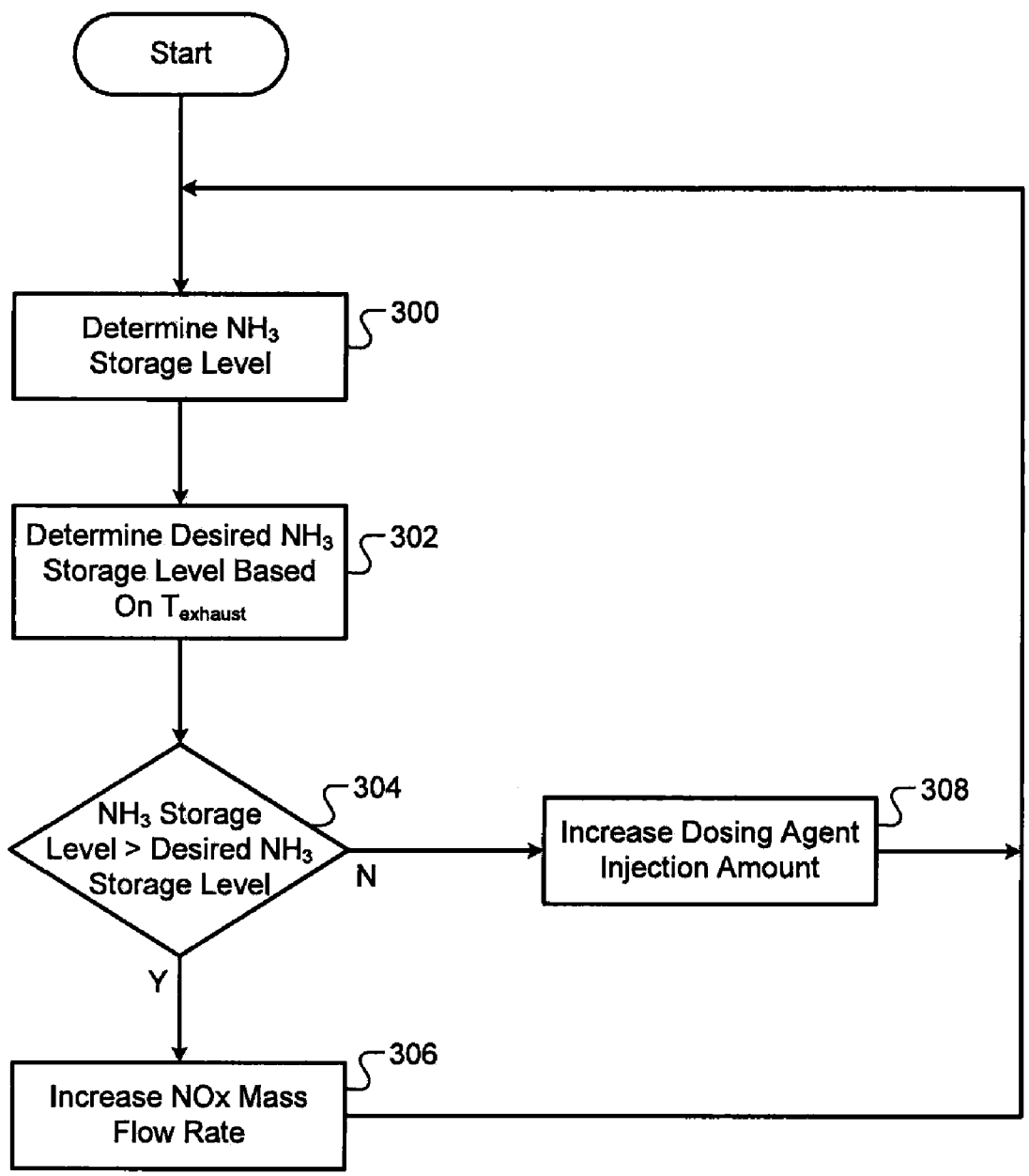
FIG. 3 is a flowchart illustrating exemplary steps of a $NH_3$ storage control method according to the present disclosure.

Referring now to FIG. 3, a flowchart illustrates exemplary steps of a $NH_3$ storage control method according to the principles of the present disclosure. In step 300, control determines the $NH_3$ storage level in the SCR catalyst 128. As discussed above, control may determine the $NH_3$ storage level based on the amount of dosing agent injected via the valve 134 and the amount of $NH_3$ consumed in the SCR catalyst 128.

In step 302, control determines the desired $NH_3$ storage level based on an exhaust temperature ($T_{exhaust}$). Control may determine the desired $NH_3$ storage level using a predetermined relationship between the exhaust temperature and the desired $NH_3$ storage level that maximizes the $NO_x$ conversion efficiency in the SCR catalyst 128 while avoiding $NH_3$ slip.

In step 304, control determines whether the $NH_3$ storage level is greater than the desired $NH_3$ storage level. When the $NH_3$ storage level is greater than the desired $NH_3$ storage level, control increases the $NO_x$ mass flow rate to reduce the $NH_3$ storage level in step 306. When the $NH_3$ storage level is less than or equal to the desired $NH_3$ storage level, control may increase the amount of dosing agent injected to increase the $NH_3$ storage level in step 308.

Control may increase the $NO_x$ mass flow rate using proportional, proportional-integral, or proportional-integral-derivative control methods. In addition, control may increase the $NO_x$ mass flow rate based on a predetermined relationship between the $NO_x$ mass flow rate and the $NH_3$ storage level. For example only, the predetermined relationship may be a model calculation or a reference table.

Figure 4:
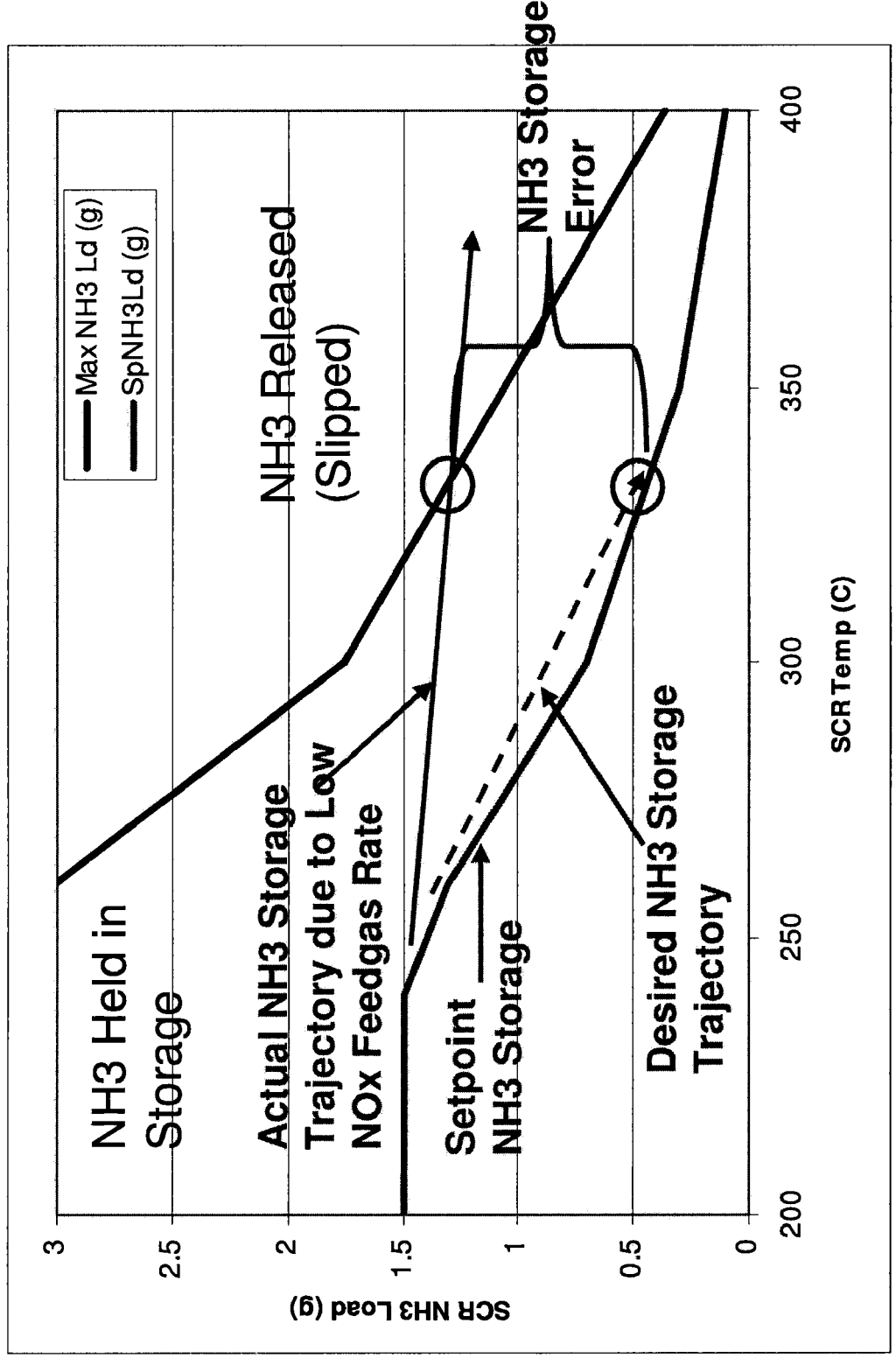
FIG. 4 is a graph illustrating relationships between $NH_3$ storage levels and a temperature of a selective catalytic reduction (SCR) catalyst.

Referring now to FIG. 4, relationships between $NH_3$ storage levels (SCR $NH_3$ Load) and a temperature of the SCR catalyst 128, or a SCR temperature (SCR Temp), are illustrated. The setpoint $NH_3$ storage (SpNH$_3$Ld) is the $NH_3$ storage level that maximizes $NO_x$ conversion efficiency in the SCR catalyst 128 while avoiding $NH_3$ slip. The desired $NH_3$ storage trajectory generally tracks the setpoint $NH_3$ storage.

The $NH_3$ storage level may be reduced by decreasing the amount of dosing agent injected from the dosing system 132. However, the $NH_3$ storage capacity (Max $NH_3$ Ld) of the SCR catalyst 128 decreases as the SCR temperature increases. Thus, when the SCR temperature increases rapidly at a low $NO_x$ mass flow rate upstream of the SCR catalyst 128 ($NO_x$ feedgas rate), $NH_3$ slip may occur although the valve 134 is shutoff to prevent dosing agent from entering the exhaust. To avoid $NH_3$ slip, the $NO_x$ mass flow rate may be adjusted in proportion to a difference between the actual and desired $NH_3$ storage ($NH_3$ storage error) to consume excess $NH_3$ stored in the SCR catalyst 128. In this manner, when the $NO_x$ feedgas rate is low and the SCR temperature increases rapidly, $NO_x$ consumed in the SCR catalyst 128 may be maximized while avoiding $NH_3$ slip.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system, comprising:
an ammonia ($NH_3$) storage level determination module that determines a $NH_3$ storage level corresponding to a level of ammonia stored in a selective catalytic reduction (SCR) catalyst of an exhaust system;
a desired $NH_3$ storage level determination module that determines a desired $NH_3$ storage level based on an exhaust temperature; and
a nitrogen oxide ($NO_x$) mass flow rate control module that controls a $NO_x$ mass flow rate upstream from the SCR catalyst based on a difference between said $NH_3$ storage level and said desired $NH_3$ storage level.

2. The control system of claim 1 wherein said NH3 storage level determination module determines said $NH_3$ storage level based on a dosing agent injection amount and a $NH_3$ consumption amount.

3. The control system of claim 1 wherein said NOx mass flow rate control module adjusts said NOx mass flow rate in proportion to said difference between said NH3 storage level and said desired NH3 storage level.

4. The control system of claim 1 wherein said NOx mass flow rate control module increases said NOx mass flow rate when said NH3 storage level is greater than said desired NH3 storage level.

5. The control system of claim 1 wherein said NOx mass flow rate control module controls said NOx mass flow rate by adjusting an air-to-fuel (A/F) ratio in an engine.

6. The control system of claim 1 wherein said NOx mass flow rate control module controls said NOx mass flow rate by adjusting an exhaust gas recirculation (EGR) valve.

7. The control system of claim 6 wherein said NOx mass flow rate control module adjusts said EGR valve based on a predetermined relationship between a mass airflow (MAF) and a desired NOx mass flow rate.

8. The control system of claim 7 wherein said NOx mass flow rate control module adjusts said EGR valve toward a closed position to increase said MAF.

9. The control system of claim 1 wherein said NOx mass flow rate control module controls said NOx mass flow rate by adjusting an injection timing of fuel injectors.

10. The control system of claim 9 wherein said NOx mass flow rate control module advances said injection timing to increase said NOx mass flow rate.

11. A method, comprising:
determining an ammonia (NH3) storage level corresponding to a level of ammonia stored in a selective catalytic reduction (SCR) catalyst of an exhaust system;
determining a desired NH3 storage level based on an exhaust temperature; and
controlling a nitrogen oxide (NOx) mass flow rate upstream from the SCR catalyst based on a difference between said NH3 storage level and said desired NH3 storage level.

12. The method of claim 11 further comprising determining said NH3 storage level based on a dosing agent injection amount and a NH3 consumption amount.

13. The method of claim 11 further comprising adjusting said NOx mass flow rate in proportion to said difference between said NH3 storage level and said desired NH3 storage level.

14. The method of claim 11 further comprising increasing said NOx mass flow rate when said NH3 storage level is greater than said desired NH3 storage level.

15. The method of claim 11 further comprising controlling said NOx mass flow rate by adjusting an air-to-fuel (A/F) ratio in an engine.

16. The method of claim 11 further comprising controlling said NOx mass flow rate by adjusting an exhaust gas recirculation (EGR) valve.

17. The method of claim 16 further comprising adjusting said EGR valve based on a predetermined relationship between a mass airflow (MAF) and a desired NOx mass flow rate.

18. The method of claim 17 further comprising adjusting said EGR valve toward a closed position to increase said MAF.

19. The method of claim 11 further comprising controlling said NOx mass flow rate by adjusting an injection timing of fuel injectors.

20. The method of claim 19 further comprising advancing said injection timing to increase said NOx mass flow rate.

* * * * *